(12) United States Patent
Cho

(10) Patent No.: US 11,068,438 B2
(45) Date of Patent: Jul. 20, 2021

(54) DATA PROCESSING CIRCUIT, DATA STORAGE DEVICE INCLUDING THE SAME, AND OPERATING METHOD THEREOF

(71) Applicant: SK hynix Inc., Gyeonggi-do (KR)

(72) Inventor: Kyoung Lae Cho, Gyeonggi-do (KR)

(73) Assignee: SK hynix Inc., Gyeonggi-do (KR)

(*) Notice: Subject to any disclaimer, the term of this patent is extended or adjusted under 35 U.S.C. 154(b) by 775 days.

(21) Appl. No.: 14/873,975

(22) Filed: Oct. 2, 2015

(65) Prior Publication Data

US 2016/0350316 A1   Dec. 1, 2016

(30) Foreign Application Priority Data

May 29, 2015   (KR) .................. 10-2015-0076165

(51) Int. Cl.
*G06F 17/00* (2019.01)
*G06F 16/11* (2019.01)
*G06F 16/28* (2019.01)

(52) U.S. Cl.
CPC .......... *G06F 16/116* (2019.01); *G06F 16/285* (2019.01)

(58) Field of Classification Search
None
See application file for complete search history.

(56) References Cited

U.S. PATENT DOCUMENTS

| | | | |
|---|---|---|---|
| 4,993,029 A * | 2/1991 | Galbraith | G11B 20/10 714/702 |
| 6,543,021 B1 | 4/2003 | Piret | |
| 6,711,709 B1 | 3/2004 | York | |
| 7,710,758 B2 | 5/2010 | Jo | |
| 8,095,859 B1 | 1/2012 | Peterson et al. | |
| 8,195,622 B2 | 6/2012 | Albert et al. | |
| 8,332,723 B2 | 12/2012 | Song et al. | |
| 8,443,251 B1 | 5/2013 | Zhang et al. | |
| 8,499,217 B2 | 7/2013 | Song et al. | |
| 8,527,718 B2 | 9/2013 | Zwisier et al. | |
| 8,527,720 B2 | 9/2013 | Jess | |
| 8,527,843 B2 | 9/2013 | Ramesh et al. | |
| 8,839,077 B2 | 9/2014 | Ueng et al. | |
| 9,009,567 B2 | 4/2015 | Baptist et al. | |
| 9,081,677 B2 | 7/2015 | Miyata et al. | |

(Continued)

FOREIGN PATENT DOCUMENTS

| | | |
|---|---|---|
| KR | 10-2011-0067656 A | 6/2011 |
| KR | 1020120095609 | 8/2012 |
| KR | 10-2015-0017948 A | 2/2015 |

OTHER PUBLICATIONS

Author: Manohar Ayinala, Keshab K. Parhi; Title "Efficient Parallel VLSI Architecture for Linear Feedback Shift Registers"; Date: 2010; Publisher: IEEE; Pertinent Pages: whold document as attached (pp. 52-57) (Year: 2010).*

(Continued)

*Primary Examiner* — Anhtai V Tran
(74) *Attorney, Agent, or Firm* — IP & T Group LLP

(57) ABSTRACT

A data processing circuit includes a plurality of transformation blocks suitable for respectively transforming in parallel a plurality of input bit groups into a plurality of output bit groups, wherein each of the transformation blocks transforms a corresponding input bit group into a corresponding output bit group by using a random pattern.

16 Claims, 6 Drawing Sheets

(56) References Cited

U.S. PATENT DOCUMENTS

| | | |
|---|---|---|
| 9,214,964 B1 | 12/2015 | Varnica et al. |
| 9,231,623 B1 | 1/2016 | Kumar et al. |
| 9,495,243 B2 | 11/2016 | Lu et al. |
| 10,102,066 B2 | 10/2018 | Cho |
| 10,396,827 B2 | 8/2019 | Cho |
| 2006/0156189 A1 | 7/2006 | Tomlin |
| 2007/0033485 A1 | 2/2007 | Cohen et al. |
| 2007/0043998 A1 | 2/2007 | Lakkis |
| 2007/0047660 A1 | 3/2007 | Mitani et al. |
| 2007/0206675 A1 | 9/2007 | Tanaka |
| 2007/0226593 A1 | 9/2007 | Mead et al. |
| 2008/0205145 A1* | 8/2008 | Kanno ............... G11C 16/3418 365/185.05 |
| 2009/0015291 A1 | 1/2009 | Kim et al. |
| 2009/0177931 A1 | 7/2009 | Song et al. |
| 2009/0180533 A1 | 7/2009 | Bushell |
| 2009/0193213 A1* | 7/2009 | Winter ................... H03M 7/30 711/165 |
| 2009/0276609 A1 | 11/2009 | Moyer et al. |
| 2010/0088575 A1 | 4/2010 | Sharon et al. |
| 2013/0132792 A1 | 5/2013 | Yamaki |
| 2013/0254616 A1 | 9/2013 | Yang |
| 2013/0254623 A1 | 9/2013 | Yang et al. |
| 2013/0254639 A1 | 9/2013 | Krishnan et al. |
| 2013/0265842 A1 | 10/2013 | Ware et al. |
| 2013/0276038 A1 | 10/2013 | Kiura |
| 2014/0068320 A1 | 3/2014 | Vedpathak et al. |
| 2014/0122962 A1 | 5/2014 | Kodavalla |
| 2014/0168811 A1 | 6/2014 | Yang et al. |
| 2015/0095274 A1* | 4/2015 | Lamb ..................... G06N 3/049 706/25 |
| 2015/0169406 A1 | 6/2015 | Li et al. |
| 2015/0195581 A1 | 7/2015 | Lee et al. |
| 2015/0279421 A1 | 10/2015 | Wilson et al. |
| 2015/0301985 A1* | 10/2015 | Zhang ................... G06F 17/141 708/403 |
| 2015/0312027 A1* | 10/2015 | Kim ....................... H04L 9/002 380/28 |
| 2015/0363263 A1 | 12/2015 | Hassner et al. |
| 2016/0006459 A1 | 1/2016 | Hanham et al. |
| 2016/0006462 A1 | 1/2016 | Hanham et al. |
| 2016/0011939 A1 | 1/2016 | Luby |
| 2016/0154698 A1 | 6/2016 | Kazi |
| 2016/0179608 A1 | 6/2016 | Gorobets et al. |
| 2016/0249234 A1 | 8/2016 | Zhang et al. |
| 2016/0292426 A1* | 10/2016 | Gibart ..................... G06F 21/85 |
| 2018/0032396 A1 | 2/2018 | Sharon et al. |
| 2018/0034477 A1 | 2/2018 | Zamir et al. |
| 2020/0004677 A1 | 1/2020 | Firoozshahian et al. |

OTHER PUBLICATIONS

Wu W.Q. et al., Design of parameterized LFSR modules based on VHDL, Journal of Naval University of Engineering, Jun 2009, pp. 90-94, vol. 21, No. 3, China Academic Journal Electronic Publishing House.

Office Action issued by State Intellectual Property Office (SIPO) of China dated Apr. 13, 2020.

Office Action issued by the Korea Intellectual Property Office dated Jan. 26, 2021.

Notice of Allowance issued by the USPTO for U.S. Appl. No. 16/517,144 dated Mar. 3, 2021.

Notice of Allowance issued by the USPTO for U.S. Appl. No. 16/549,930 dated Mar. 30, 2021.

* cited by examiner

DATA PROCESSING CIRCUIT, DATA STORAGE DEVICE INCLUDING THE SAME, AND OPERATING METHOD THEREOF

CROSS-REFERENCES TO RELATED APPLICATION

The present application claims priority under 35 U.S.C. § 119(a) to Korean application number 10-2015-0076165, filed on May 29, 2015, which is incorporated herein by reference in its entirety.

BACKGROUND

1. Technical Field

Various embodiments generally relate to a data storage device and, more particularly, to a data storage device capable of randomizing and de-randomizing data.

2. Related Art

Data storage devices store data provided from an external device in response to a write request from the external device. Data storage devices also provide stored data to external devices in response to a read request from the external device. The external device is an electronic device capable of processing data, examples of which include computers, digital cameras and mobile phones. Data storage devices may be embedded in the external device, or may be physically separate but electrically coupled to the external device.

The data storage device may be a personal computer memory card international association (PCMCIA) card, a compact flash (CF) card, a smart media card, a memory stick, a multimedia card in the form of an MMC, an eMMC, an RS-MMC and an MMC-micro, a secure digital card in the form of an SD, a mini-SD and a micro-SD, a universal flash storage (UFS), or a solid state drive (SSD).

A data storage device includes nonvolatile memory for data storage. A nonvolatile memory apparatus can retain stored data even without a constant power source. Examples of nonvolatile memory apparatuses include flash memory, such as NAND flash or NOR flash, ferroelectric random access memory (FeRAM), phase change random access memory (PCRAM), magnetoresistive random access memory (MRAM) and resistive random access memory (RERAM).

SUMMARY

In an embodiment of the present Invention, a data processing circuit may include: a plurality of transformation blocks suitable for respectively transforming in parallel a plurality of input bit groups into a plurality of output bit groups, wherein each of the transformation blocks transforms a corresponding input bit group into a corresponding output bit group using a random pattern.

In an embodiment of the present invention, a data storage device may include: a plurality of transformation blocks suitable for respectively transforming in parallel a plurality of write bit groups into a plurality of transformed write bit groups; and a nonvolatile memory apparatus suitable for storing the transformed write bit groups.

In an embodiment of the present invention, a method for operating a data storage device may include: transforming respectively in parallel a plurality of write bit groups into a plurality of transformed write bit groups; and storing the transformed write bit groups.

DETAILED DESCRIPTION

Figure 1:
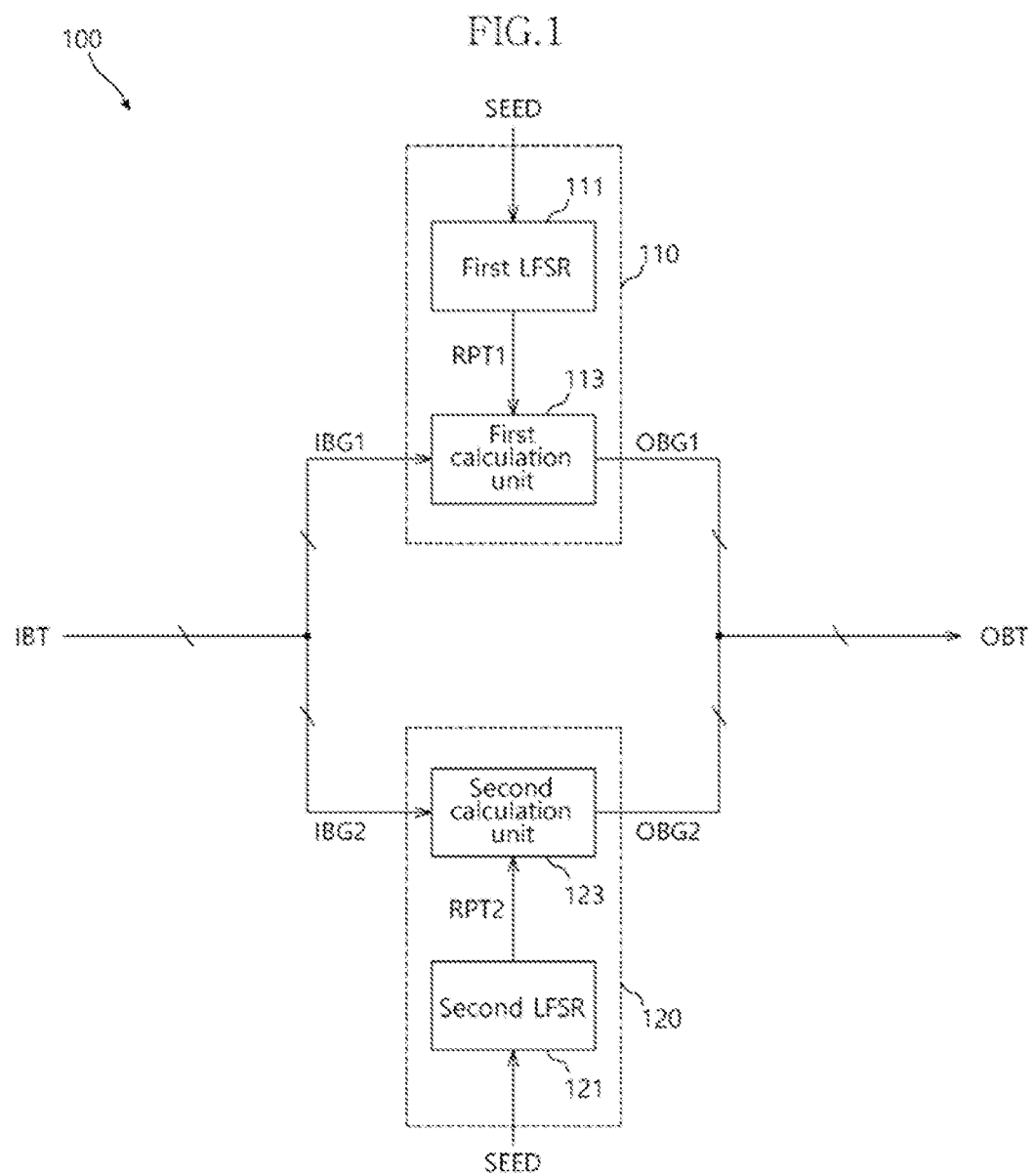
FIG. 1 is a block diagram exemplarily illustrating a data processing circuit in accordance with an embodiment of the present invention.

Hereinafter, a data processing system and an operating method thereof according to the present invention will be described with reference to the accompanying drawings through exemplary embodiments of the present invention. The present invention may, however, be embodied in different forms and should not be construed as limited to the embodiments set forth herein. Rather, these embodiments are provided to describe the present invention in detail to the extent that a person skilled in the art to which the invention pertains can enforce the technical concepts of the present invention.

It is to be understood that embodiments of the present invention are not limited to the particulars shown in the drawings, that the drawings are not necessarily to scale, and, in some instances, proportions may have been exaggerated to more clearly depict certain features of the invention. While particular terminology is used, it is to be appreciated that the terminology used is for describing particular embodiments only and is not intended to limit the scope of the present invention.

FIG. 1 is a block diagram exemplarily illustrating a data processing circuit 100 in accordance with an embodiment of the present invention.

Referring to FIG. 1, the data processing circuit 100 may transform a plurality of input bits IBT into a plurality of output bits OBT, and output the output bits OBT. The data processing circuit 100 may generate the output bits OBT by randomizing the input bits IBT. The data processing circuit 100 may generate output data by randomizing a pattern of the input bits IBT in order to minimize data Interference and suppress data deformation.

The plurality of input bits IBT may be inputted in parallel to the data processing circuit 100. For example, the total number of the bits inputted in parallel to the data processing circuit 100 may be 8, 16 or the like.

The plurality of input bits IBT may be grouped into a plurality of input bit groups. For example, upper half bits and lower half bits among the plurality of input bits IBT may be grouped into first and second input bit groups IBG1 and IBG2, respectively. The number of input bit groups are not intended to be a limiting feature.

The data processing circuit 100 may include a plurality of transformation blocks, for example, first and second transformation blocks 110 and 120.

The first and second input bit groups IBG1 and IBG2 may be inputted in parallel to the first and second transformation blocks 110 and 120. The first input bit group IBG1 may be inputted to the first transformation block 110, and at substantially the same time, the second input bit group IBG2 may be inputted to the second transformation block 120. The plurality of input bits IBT comprising the first and second input bit groups IBG1 and IBG2 may be inputted in parallel to the first and second transformation blocks 110 and 120.

The first and second transformation blocks 110 and 120 may respectively transform the first and second input bit groups IBG1 and IBG2 in parallel into first and second output bit groups OBG1 and OBG2. The first transformation block 110 may transform the first input bit group IBG1 into the first output bit group OBG1, and at substantially the same time, the second transformation block 120 may transform the second input bit group IBG2 into the second output bit group OBG2.

The first and second transformation blocks 110 and 120 may respectively output in parallel the first and second output bit groups OBG1 and OBG2. The first and second transformation blocks 110 and 120 may output in parallel the output bits OBT comprising the first and second output bit groups OBG1 and OBG2.

The first transformation block 110 may include a first random pattern generation unit 111 and a first calculation unit 113.

The first random pattern generation unit 111 may generate a first random pattern RPT1 based on a seed SEED. The first random pattern generation unit 111 may include a first linear feedback shift register (hereinafter, referred to as a 'first LFSR') for generating the first random pattern RPT1 based on the seed SEED.

The first calculation unit 113 may perform a logic operation on the first input bit group IBG1 and the first random pattern RPT1, and generate the first output bit group OBG1. For example, the logic operation of the first calculation unit 113 may be an XOR operation.

The second transformation block 120 may include a second random pattern generation unit 121 and a second calculation unit 123.

The second random pattern generation unit 121 may generate a second random pattern RPT2 based on the seed SEED. The second random pattern generation unit 121 may include a second linear feedback shift register (hereinafter, referred to as a 'second LFSR') for generating the second random pattern RPT2 based on the seed SEED.

The second calculation unit 123 may perform a logic operation on the second input bit group IBG2 and the second random pattern RPT2, and generate the second output bit group OBG2. For example, the logic operation of the second calculation unit 123 may be an XOR operation.

In accordance with the embodiment, the first and second LFSRs 111 and 121 may correspond to different characteristic polynomials. Meanwhile, in accordance with the embodiment, when the data processing circuit 100 includes at least three LFSRs, the LFSRs may correspond to at least two characteristic polynomials.

In accordance with the embodiment, each of the first and second LFSRs 111 and 121 may generate a maximum length sequence.

In accordance with the embodiment, the degrees of the characteristic polynomials of the first and second LFSRs 111 and 121 may be a multiple number of the plurality of input bit groups IBG1 and IBG2 inputted to the first and second transformation blocks 110 and 120, respectively. In accordance with the embodiment, the degree of each of the characteristic polynomials of the first and second LFSRs 111 and 121 may be a multiple number of the plurality of input bits IBT inputted to the data processing circuit 100.

In accordance with the embodiment, the data processing circuit 100 may inverse transform the transformed data by performing the above-described data transformation process. When the output bits OBT are inputted in parallel to the first and second transformation blocks 110 and 120, the first and second transformation blocks 110 and 120 may respectively transform in parallel the first and second output bit groups OBG1 and OBG2 into the first and second input bit groups IBG1 and IBG2. Further, the first and second transformation blocks 110 and 120 may output in parallel the first and second input bit groups IBG1 and IBG2, that is, the input bits IBT.

Even though it is illustrated in FIG. 1 that the data processing circuit 100 includes two transformation blocks 110 and 120, the number of transformation blocks included in the data processing circuit 100 is not be specifically limited. The number of the transformation blocks included in the data processing circuit 100 may determine the bit number of respective input bit groups. For example, when the number of transformation blocks included in the data processing circuit 100 is L, the bit number of respective input bit groups of the input bits IBT having J number of bits will be J/L. The number of bits of each output bit group may be set to be the same as the number of bits of each input bit group.

Figure 2:
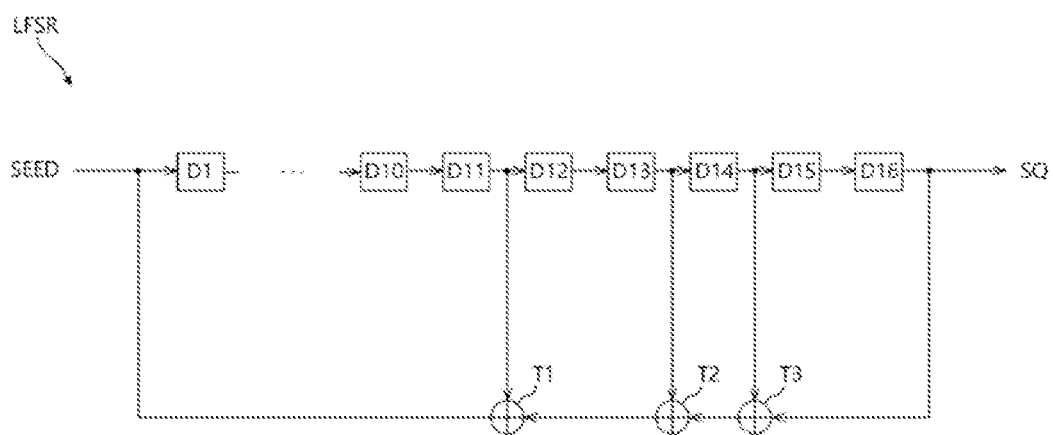
FIG. 2 is a diagram illustrating an example of first and second LFSRs shown in FIG. 1.

FIG. 2 is a diagram illustrating an example of the first and second LFSRs 111 and 123 shown in FIG. 1. FIG. 2 illustrates an LFSR of the Fibonacci implementation, another implementation, for example, an LFSR of the Galois implementation, may also be realized.

Referring to FIG. 2, the LFSR may include 16 registers D1 to D16 which are electrically coupled in series. The seed SEED may be inputted to the first register D1, each of the registers D1 to D15 may shift a stored value to next register each time a clock signal is enabled (not shown), and the last register D16 may output a sequence SQ. FIG. 2 exemplarily shows the outputs of the registers D16, D14, D13 and D11 as the tabs. The tabs may be fed back to the first register D1 after XOR operations through XOR operation units T1 to T3. The LFSR may be used to generate a random pattern, for example, each of the first and second random patterns RPT1 and RPT2 of FIG. 1. The LFSR may generate a random pattern of K bits based on the values stored in K number of registers selected among N number of total registers in the LSFR each time the clock signal is enabled.

The LFSR comprising N number of total registers may correspond to the following characteristic polynomial.

$$f(x)=x^N+a_{(N-1)}x^{(N-1)}+a_{(N-2)}x^{(N-2)}+\ldots+a_1x+1$$

In the above polynomial, the coefficient $a_i$ may be 0 or 1 according to the positions of the tabs. For example, the LFSR shown in FIG. 2 may correspond to the following characteristic polynomial.

$$f(x)=x^{16}+x^{14}+x^{13}+x^{11}+1$$

The LFSR shown in FIG. 2 may correspond to a tab sequence [16, 14, 13, 11] representing the positions of the tabs.

The sequence SQ outputted from the last register D16 in response to the enablement of the clock signal, that is, the output of the LFSR may be repeated with a predetermined cycle.

When the characteristic polynomial of the LFSR is a primitive polynomial, the LFSR may output the sequence SQ with a maximum length. When the LFSR including the N registers outputs the sequence SQ with a maximum length, the length of the sequence SQ may be $2^N-1$. In other words, when the LFSR outputs the sequence SQ with a maximum length, the sequence SQ may be repeated with a cycle of $2^N-1$. The sequence SQ may be defined as a maximum length sequence or an M-sequence. The M-sequence may be outputted when the N registers have $2^N-1$ number of states except that all of the N registers have the state of 0.

For example, the tab progressions of the LFSR including 4 tabs and outputting the M-sequence may be as follows:

[16, 15, 13, 4], [16, 15, 12, 10], [16, 15, 12, 1], [16, 15, 10, 4], [16, 15, 9, 6,], [16, 15, 9, 4,], [16, 15, 7, 2,], [16, 15, 4, 2,], [16, 14, 13, 11], [16, 14, 13, 5], [16, 14, 12, 7], [16, 14, 11, 7], [16, 14, 9, 7], [16, 14, 9, 4,], [16, 14, 8, 3,], [16, 13, 12, 11], [16, 13, 12, 7], [16, 13, 11, 6], [16, 13, 9, 6,], [16, 13, 6, 4,], [16, 12, 9, 7,], [16, 12, 9, 6], [16, 11, 10, 5], [16, 11, 9, 8,], [16, 11, 9, 7,], [16, 10, 9, 6,].

As to the representative characteristics of the M-sequence, the M-sequence may have the maximum cycle of $2^N-1$, and the M-sequence may include $2^{(N-1)}$ number of 1s and $2^{(N-1)}-1$ number of 0s. Therefore, the random pattern generated from the LFSR, which outputs the M-sequence, may improve randomness of data.

Referring again to FIG. 1, the first and second random pattern generation units 111 and 121 may be the same or different.

In accordance with the embodiment, the first and second LFSRs 111 and 121 may correspond to different characteristic polynomials, in which case the first and second LFSRs 111 and 121 may output different sequences or different random patterns RPT1 and RPT2 based on the same seed SEED.

In accordance with the embodiment, the degree of the characteristic polynomials of the first and second LFSRs 111 and 121 may be a multiple number of the plurality of input bit groups IBG1 and IBG2 inputted to the first and second transformation blocks 110 and 120, respectively. Each of the first and second LFSRs 111 and 121 may include N number of registers in total, and the N may be a multiple number of each of the plurality of input bit groups IBG1 and IBG2.

In accordance with the embodiment, the degree of each of the characteristic polynomials of the first and second LFSRs 111 and 121 may be a multiple number of the plurality of input bits IBT inputted to the data processing circuit 100. For example, each of the first and second LFSRs 111 and 121 may include N number of registers in total, and the N may be a multiple number of the plurality of input bits IBT.

In accordance with the embodiment, each of the first and second LFSRs 111 and 121 may output the M-sequence. When each of the first and second LFSRs 111 and 121 includes N number of the registers in total, the first and second LFSRs 111 and 121 may output the sequences SQ or the first and second random patterns RPT1 and RPT2 with the cycle of $2^N-1$, respectively.

Figure 3:
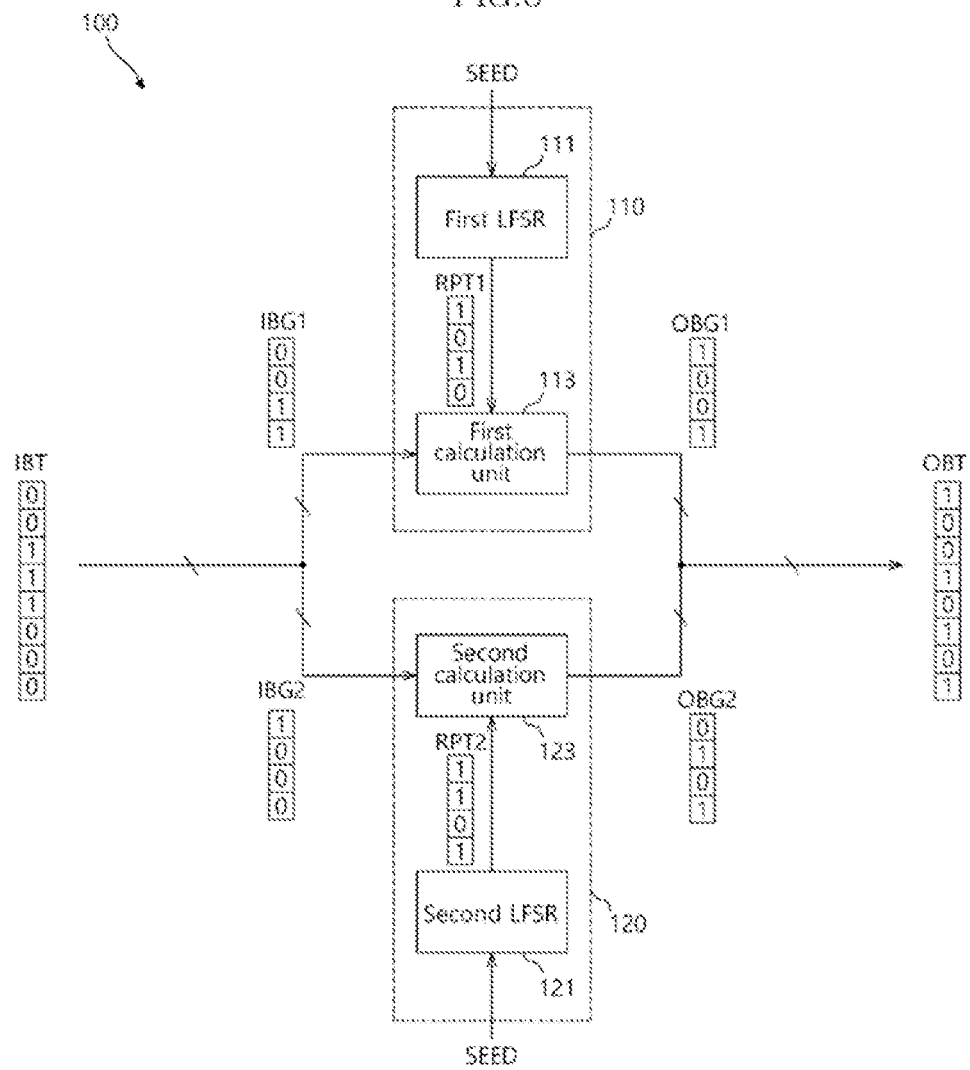
FIG. 3 is a block diagram exemplarily illustrating randomization and de-randomization of a data processing circuit of FIG. 1 in accordance with an embodiment of the present invention.

FIG. 3 is a block diagram exemplarily illustrating randomization and de-randomization of the data processing circuit 100 of FIG. 1 in accordance with an embodiment of the present invention. FIG. 3 exemplarily shows upper 4 bits and lower 4 bits, among the input bits IBT of 8 bits, that are grouped into the first and second input bit groups IBG1 and IBG2, respectively.

The input bits IBT may be inputted in parallel to the data processing circuit 100. The first and second input bit groups IBG1 and IBG2 may be respectively inputted in parallel to the first and second transformation blocks 110 and 120.

The first and second LFSRs 111 and 121 may generate the different first and second random patterns RPT1 and RPT2 based on the seed SEED due to the different characteristic polynomials. The first calculation unit 113 may generate the first output bit group OBG1 by performing an XOR operation on corresponding bits of the first input bit group IBG1 and the first random pattern RPT1, and at substantially the same time, the second calculation unit 123 may generate the second output bit group OBG2 by performing an XOR operation on corresponding bits of the second input bit group IBG2 and the second random pattern RPT2.

The first and second output bit groups OBG1 and OBG2 may be outputted in parallel from the first and second transformation blocks 110 and 120. The output bits OBT comprising the first and second output bit groups OBG1 and OBG2 may be outputted in parallel from the data processing circuit 100.

Figure 4:
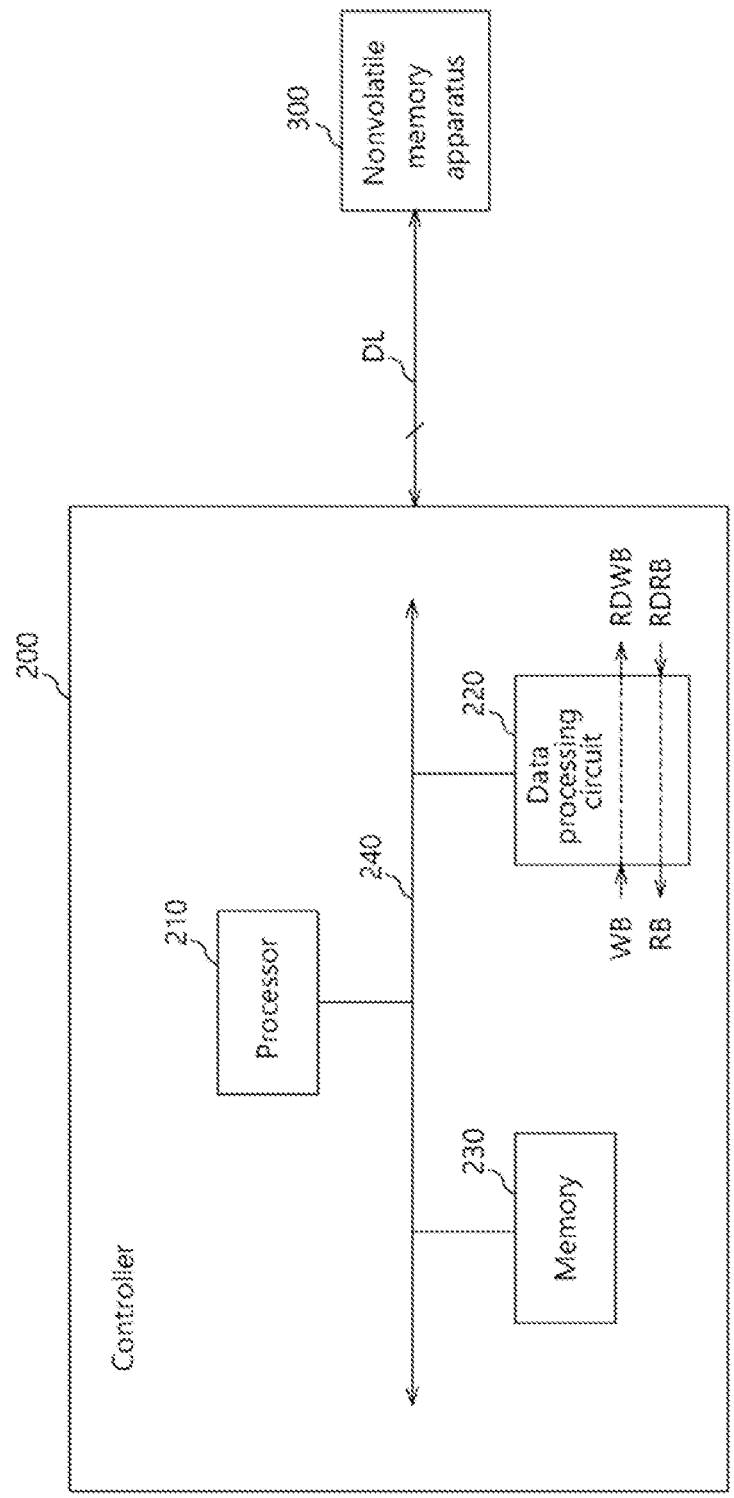
FIG. 4 is a block diagram exemplarily illustrating a data storage device in accordance with an embodiment of the present invention.

FIG. 4 is a block diagram exemplarily illustrating the data storage device 100 in accordance with an embodiment of the present invention.

The data storage device 10 may include a controller 200 and a nonvolatile memory apparatus 300.

The controller 200 may include a processor 210, a data processing circuit 220, and a memory 230, which may be electrically coupled and communicate with one another through an internal bus 240.

The processor 210 may control the general operations of the data storage device 10. The processor 210 may control the components of the controller 200 to perform predetermined functions. The processor 210 may control the write operation or the read operation of the nonvolatile memory apparatus 300 in response to a write request or a read request from an external device.

The data processing circuit 220 may transform write bits WB to be stored in the nonvolatile memory apparatus 300 into transformed write bits RDWB, and may inverse transform the read bits RDRB, which are read from the nonvolatile memory apparatus 300, into inverse-transformed read bits RB. When the transformed write bits RDWB have the same value as the read bits RDRB, the inverse-transformed read bits RB may have the same values as the write bits WB, which means that the write bits WB may be restored to have the original value through the transformation process as described above with reference to FIGS. 1 to 3 when the write bits WB are stored in and then read from the nonvolatile memory apparatus 300.

The data processing circuit 220 may include a plurality of transformation blocks (not shown). The plurality of transformation blocks may respectively transform in parallel a plurality of write bit groups included in the write bits WB into a plurality of transformed write bit groups, and may respectively output in parallel the plurality of transformed write bit groups. The transformed write bits RDWB may comprise the plurality of transformed write bit groups.

Further, the data processing circuit 220 may inverse transform in parallel a plurality of read bit groups included in the read bits RDRB into a plurality of inverse-transformed read bit groups. The inverse-transformed read bits RB may comprise the plurality of inverse-transformed read bit groups. The data processing circuit 220 may inverse transform the read bits RDRB into the plurality of inverse-transformed read bits RB by performing a transformation process to the plurality of read bits RDRB in substantially the same manner as the transformation process to the plurality of write bits WB.

The data processing circuit 220 may be the same as the data processing circuit 100 described with reference to FIGS. 1 to 3. In this case, for example, the write bits WB and the transformed write bits RDWB may be the plurality of input bits IBT and the plurality of output bits OBT described with reference to FIGS. 1 to 3, respectively.

The seed inputted to the data processing circuit 220 may correspond to a memory region of the nonvolatile memory apparatus 300, in or from which data are to be stored or read. For example, the seed may be provided to the data processing circuit 220 according to the address offset of the corresponding memory region of the nonvolatile memory apparatus 300. Accordingly, the seed corresponding to each memory region is fixed, and thus the data may be restored to have the original value through the same seed where the data is stored in and then read from the corresponding memory region of the nonvolatile memory apparatus 300 through the transformation process as described above with reference to FIGS. 1 to 3.

The memory 230 may serve as a working memory, a buffer memory or a cache memory of the processor 210. The memory 230 as a working memory may store software programs and various program data for driving the processor 210. The memory 230 as a buffer memory may buffer the data transmitted between the external device and the nonvolatile memory apparatus 300. The memory 230 as a cache memory may temporarily store cache data.

The nonvolatile memory apparatus 300 may be provided in parallel with the plurality of transformed write bits RDWB, and store the plurality of transformed write bits RDWB through a write operation. The nonvolatile memory apparatus 300 may read the plurality of transformed write bits RDWB stored therein, as the plurality of read bits RDRB, and output in parallel the plurality of read bits RDRB. The nonvolatile memory apparatus 300 may transmit and receive data in parallel to and from the controller 200 through a plurality of data lines DL.

While FIG. 4 shows an example in which the data storage device 10 includes one nonvolatile memory apparatus 300, the embodiment is not limited to such an example, and it is to be noted that the data storage device 10 may include a plurality of nonvolatile memory apparatus 300.

According to an embodiment, the data processing circuit 220 may be disposed in the nonvolatile memory apparatus 300 instead of the controller 200. In this case, the data processing circuit 220 may transform the plurality of write bits WB transmitted from the controller 200, and may inverse transform the read bits RDRB into the inverse-transformed read bits RB and transmit the inverse-transformed read bits RB to the controller 200.

According to an embodiment, the data processing circuit 220 may be integrated into a separate chip and be disposed between the controller 200 and the nonvolatile memory apparatus 300, and may transmit transformed/inverse-transformed data between the controller 200 and the nonvolatile memory apparatus 300.

Figure 5:
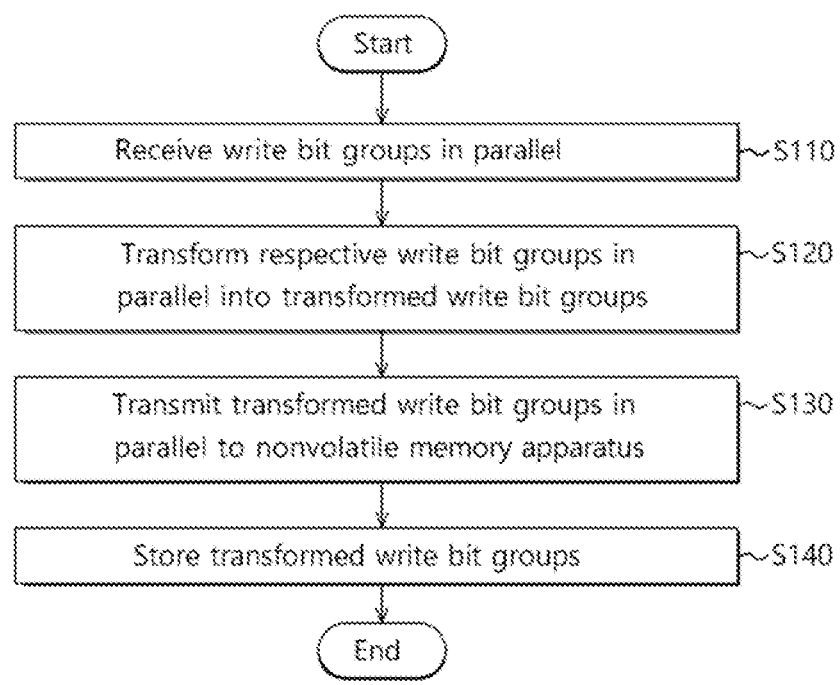
FIG. 5 is a flow chart exemplarily illustrating an operation of a data storage device of FIG. 4 in accordance with an embodiment of the present invention.

FIG. 5 is a flow chart exemplarily illustrating an operation of the data storage device 10 of FIG. 4 in accordance with an embodiment of the present invention. FIG. 5 shows a process of transforming data to be stored in the nonvolatile memory apparatus 300.

Referring to FIGS. 4 and 5, at step S110, the data processing circuit 220 may receive in parallel the plurality of write bit groups included in the plurality of write bits WB. The plurality of write bits WB may be inputted in parallel to the data processing circuit 220.

At step S120, the plurality of transformation blocks included in the data processing circuit 220 may transform in parallel the plurality of write bit groups into the transformed write bit groups through different random patterns, respectively.

At step S130, the controller 200 may transmit in parallel the plurality of transformed write bit groups to the nonvolatile memory apparatus 300. The plurality of transformed write bits RDWB may comprise the plurality of transformed write bit groups.

At step S140, the nonvolatile memory apparatus 300 may store the transformed write bit groups through a write operation.

Figure 6:
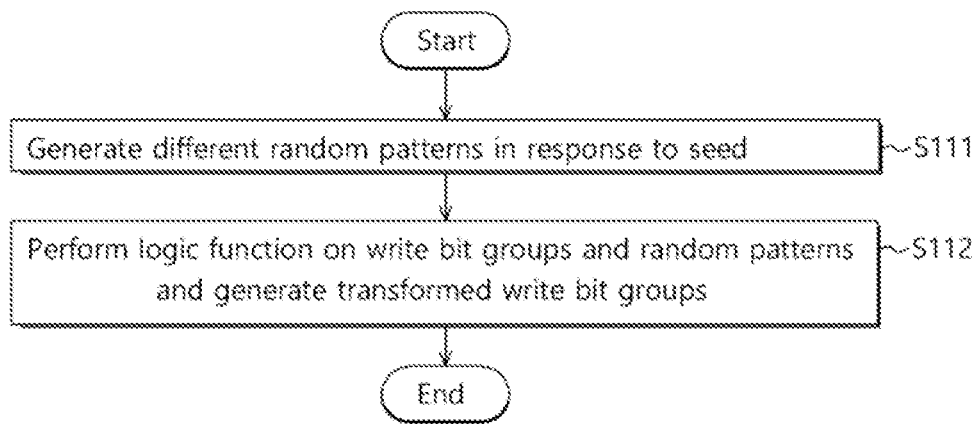
FIG. 6 is a flow chart exemplarily illustrating an operation of a data processing circuit of FIG. 4 in accordance with an embodiment of the present invention.

FIG. 6 is a flow chart exemplarily illustrating an operation of the data processing circuit 220 of FIG. 4 in accordance with an embodiment of the present invention. FIG. 6 exemplarily shows step S120 described with reference to FIG. 5.

Referring to FIGS. 4 and 6, at step S111, the plurality of random pattern generation units included in the data processing circuit 220 may generate a plurality of different random patterns based on a seed. The plurality of random pattern generation units may be the random pattern generation units 111 and 121 described with reference to FIGS. 1 to 3.

At step S112, the plurality of calculation units included in the data processing circuit 220 may perform logic operations on the plurality of write bit groups and the plurality of random patterns, and generate the plurality of transformed write bit groups. The plurality of calculation units may be the calculation units 113 and 123 described with reference to FIGS. 1 to 3.

Figure 7:
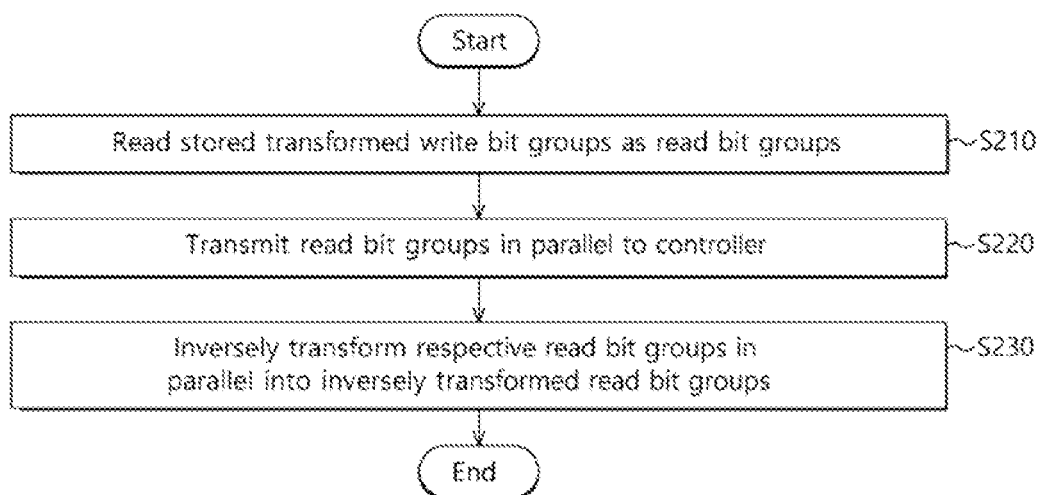
FIG. 7 is a flow chart exemplarily illustrating an operation of a data storage device of FIG. 4 in accordance with an embodiment of the present invention.

FIG. 7 is a flow chart exemplarily illustrating an operation of the data storage device 10 of FIG. 4 in accordance with an embodiment of the present invention. FIG. 7 shows a process of inverse-transforming the data read from the nonvolatile memory apparatus 300.

Referring to FIGS. 4 and 7, at step S210, the nonvolatile memory apparatus 300 may read the plurality of transformed write bit groups stored therein, as the plurality of read bit groups. The plurality of read bits RDRB may comprise the plurality of read bit groups.

At step S220, the nonvolatile memory apparatus 300 may transmit in parallel the plurality of read bit groups to the controller 200.

At step S230, the plurality of transformation blocks included in the data processing circuit 220 may respectively inverse-transform in parallel the plurality of read bit groups to generate the plurality of inverse-transformed read bit groups. The plurality of inverse-transformed read bits RB may comprise the plurality of inverse-transformed read bit groups.

According to the embodiments, it is possible to effectively improve the randomness of data to be stored in the nonvolatile memory apparatus 300 through data processing by the plurality of transformation blocks disposed in parallel. Accordingly, it is possible to secure data reliability. Moreover, the rate of increase in the hardware size of the data processing circuit 220 for the parallel process of the plurality of transformation blocks is significantly smaller than the increase rate in hardware size for increasing the degree of the LFSR in order to lengthen the sequence. Therefore an advantage may be provided in retaining price competitiveness.

While various embodiments have been described above, it will be understood to those skilled in the art that the embodiments described are examples only. Accordingly, the data processing circuit, the data storage device including the same and the operating method thereof described herein should not be limited based on the described embodiments.

What is claimed is:

1. A data processing circuit comprising:
a first transformation block configured to, by randomizing upper half bits of write bits, output upper half bits of transformed write bits; and
a second transformation block configured to, by randomizing lower half bits of the write bits, output lower half bits of the transformed write bits at substantially the same time with outputting the upper half bits of the transformed write bits,
wherein the first and second transformation blocks are configured to transform the write bits, each using an M-sequence;
wherein each of the first and second transformation blocks comprises a linear feedback shift register (LFSR) comprising N number of registers;
wherein the M-sequence is outputted when the registers have $2^N-1$ number of states except that all of the N registers have a state of zero,
wherein the write bits are data, and the transformed write bits are stored in a memory region in a NAND flash memory instead of the write bits,
wherein the LFSR included in the first transformation block generates a first random pattern based on a seed and the LFSR included in the second transformation block generates a second random pattern different from the first random pattern based on the seed, and
wherein the seed is based on an address offset of the memory region.

2. The data processing circuit according to claim 1, wherein the first and second transformation blocks receive the write bits in parallel.

3. The data processing circuit according to claim 1, wherein the first and second transformation blocks output the transformed write bits in parallel.

4. The data processing circuit according to claim 1, wherein the first and second transformation blocks comprise linear feedback shift registers (LFSRs) to generate random patterns, respectively, and
wherein the LFSRs included in the first and second transformation blocks correspond to different two primitive polynomials, respectively.

5. The data processing circuit according to claim 1, wherein the M-sequence has a cycle of $2^N-1$.

6. The data processing circuit according to claim 1, wherein N is a multiple number of half bits of the write bits.

7. The data processing circuit according to claim 1, wherein each of the first and second transformation blocks comprises:
a random pattern generation unit suitable for generating a random pattern based on the seed; and
a calculation unit suitable for performing a logic operation on the corresponding half bits of the write bits and the random pattern, and generating the corresponding half bits of the transformed write bits.

8. The data processing circuit according to claim 1, wherein N is 16, and
wherein the LFSR has 4 tabs based on one of tab sequences as follow:
[16, 15, 12, 10], [16, 15, 12, 1], [16, 15, 10, 4], [16, 15, 9, 6], [16, 15, 9, 4], [16, 15, 7, 2], [16, 15, 4, 2], [16, 14, 13, 11], [16, 14, 13, 5], [16, 14, 12, 7], [16, 14, 11, 7], [16, 14, 9, 7], [16, 14, 9, 4], [16, 14, 8, 3], [16, 13, 12, 11], [16, 13, 12, 7], [16, 13, 11, 6], [16, 13, 9, 6], [16, 13, 6, 4], [16, 12, 9, 7], [16, 12, 9, 6], [16, 11, 10, 5], [16, 11, 9, 8], [16, 11, 9, 7], and [16, 10, 9, 6].

9. A data storage device comprising:
a controller including a data processing circuit and a processor; and
a NAND flash memory apparatus including a memory region,
wherein the data processing circuit includes a transformation block which is configured to, by randomizing a write bit group included in data, output a transformed write bit group to increase randomness, using a sequence having $2^{15}$ ones and $2^{15}-1$ zeros;
wherein the transformation block comprises a linear feedback shift register (LFSR) comprising 16 registers;
wherein the sequence is outputted when the registers have $2^{15}-1$ states except that all of the registers have a state of zero;
wherein the processor is configured to control a write operation to store the transformed write bit group instead of the write bit group in the memory region,
wherein the 16 registers generate a random pattern by receiving a seed consisting of 16 bits respectively, and
wherein the seed is based on an address offset of the memory region.

10. The data storage device according to claim 9,
wherein the data processing circuit includes a second transformation block which is configured to, by randomizing a second write bit group included in the data, output a second transformed write bit group;
wherein the processor is configured to control a write operation to store the second transformed write bit group instead of the second write bit group in the NAND flash memory apparatus;
wherein the write bit group and the second write bit group are included in a plurality of write bits, and
wherein the transformation block and the second transformation block receive the write bits in parallel.

11. The data storage device according to claim 9,
wherein the data processing circuit includes a second transformation block which is configured to, by randomizing a second write bit group included in the data, output a second transformed write bit group;
wherein the processor is configured to control a write operation to store the second transformed write bit group instead of the second write bit group in the NAND flash memory apparatus;
wherein the transformed write bit group and the second transformed write bit group are included in a plurality of transformed write bits, and
wherein the transformation group and the second transformation block output the transformed write bits in parallel.

12. The data storage device according to claim 9, wherein the transformation block comprises:
a random pattern generation unit suitable for generating the random pattern based on the seed; and a calculation unit suitable for performing a logic operation on the write bit group and the random pattern, and generating the transformed write bit group.

13. The data storage device according to claim 9, wherein the LFSR corresponds to a primitive polynomial.

14. The data storage device according to claim 9, wherein the sequence has a cycle of $2^N-1$.

15. The data storage device according to claim 9, wherein the NAND flash memory apparatus reads the transformed write bit group stored therein, as a read bit group, and wherein the transformation block generates an inverse-transformed read bit group by inverse-transforming the read bit group.

16. The data storage device according to claim 9, wherein the LFSR has 4 tabs based on one of tab sequences as follow:

[16, 15, 12, 10], [16, 15, 12, 1], [16, 15, 10, 4], [16, 15, 9, 6], [16, 15, 9, 4], [16, 15, 7, 2], [16, 15, 4, 2], [16, 14, 13, 11], [16, 14, 13, 5], [16, 14, 12, 7], [16, 14, 11, 7], [16, 14, 9, 7], [16, 14, 9, 4], [16, 14, 8, 3], [16, 13, 12, 11], [16, 13, 12, 7], [16, 13, 11, 6], [16, 13, 9, 6], [16, 13, 6, 4], [16, 12, 9, 7], [16, 12, 9, 6], [16, 11, 10, 5], [16, 11, 9, 8], [16, 11, 9, 7], and [16, 10, 9, 6].

* * * * *